UNITED STATES PATENT OFFICE.

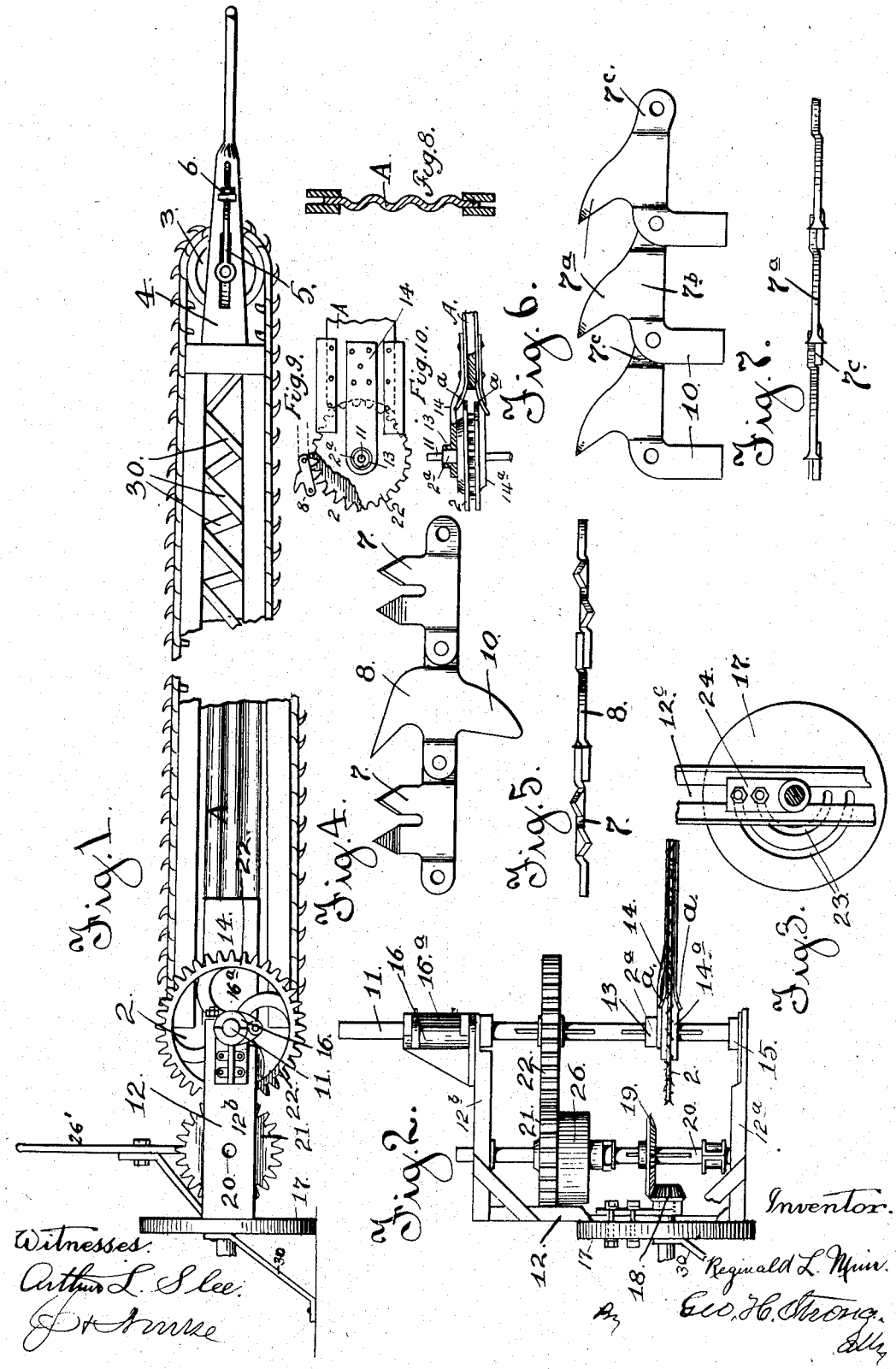

REGINALD L. MUIR, OF SAN FRANCISCO, CALIFORNIA, ASSIGNOR TO WEST COAST MACHINERY COMPANY, OF SAN FRANCISCO, CALIFORNIA, A CORPORATION OF CALIFORNIA.

CHAIN SAW.

No. 865,118.   Specification of Letters Patent.   Patented Sept. 3, 1907.

Application filed November 15, 1906. Serial No. 287,455.

*To all whom it may concern:*

Be it known that I, REGINALD L. MUIR, a citizen of the United States, residing at the city and county of San Francisco and State of California, have invented new and useful Improvements in Chain Saws, of which the following is a specification.

My invention relates to improvements in that class of saws in which the cutting teeth are connected together to form an endless flexible chain which is carried over sprockets through which power is transmitted to drive the chain of teeth.

My invention consists in the combination of parts and in details of mechanism which will be more fully explained by reference to the accompanying drawings, in which—

Figure 1 is a side elevation of my device. Fig. 2 is a partial view of the machine with the parts turned up at right angles to the position shown in Fig. 1. Fig. 3 is an end view showing the slotted disk and frame and connections. Figs. 4, 5, 6 and 7 are side and edge views of different forms of saws. Fig. 8 is a transverse section of the distance-piece showing the corrugated stiffening construction. Fig. 9 is a detail showing a portion of the frame or yoke and the gear 22 the latter being broken away to show the sprocket 2 beyond. Fig. 10 is a plan view, partly in section, of Fig. 9.

A is a distance-piece, so-called, having journaled at either end sprocket wheels as 2 and 3, around which sprocket-wheels an endless saw is adapted to travel. These sprocket-wheels are channeled or formed with grooves with which the driving spurs of the saw-teeth are engaged, the grooves serving to guide the saw and maintain it in its proper line of travel. The outermost idler sprocket 3 is preferably journaled in a yoke 4 fixed to the outer end of the distance-piece A, the sides of the yoke being slotted so that the shaft of the sprocket wheel may pass through the slots. The ends of the shaft are turnable in bearings in the inner ends of the screw shanks 5, and these screw-shanks are movable in fixed nuts as at 6 so as to regulate and maintain the tension of the chain of saws.

The saws are formed with either double or single teeth, that is the teeth may either be made of alternate single links pivoted between contiguous pairs of links so that the teeth of the pairs of links will cut the desired width of kerf, while the teeth of the single links which are pivoted between the pairs will cut the remaining central portion of the kerf; or in case of single teeth, the teeth may be alternately offset to one side and the other of the points where they are pivoted together so as to provide for the desired width of kerf.

Fig. 5 is an edge view of the alternate double and single teeth in which 7 are the teeth arranged in pairs, and 8 are the single teeth pivoted between the ends of the pairs of teeth.

In Fig. 6 I have shown the teeth $7^a$ formed upon a body portion $7^b$ and the ends of this body portion are offset to each side as shown at $7^c$ and in opposite directions.

These offset ends are pivoted together, and the teeth 7 are thus substantially in line, and the pivot pins by which they are connected passing through these offset portions will stand substantially in line with the pull of the cutting teeth, thus providing for a straight pull when the saw is in operation.

In Fig. 7 I have shown the teeth $7^a$ overlapping each other in the manner to that just previously described, and also offset so that the connecting pins are substantially in the line of pull while the offsetting of the teeth is sufficient to provide for the required kerf.

In each construction I have shown the teeth provided with lugs 10 projecting inwardly or opposite to the projection of the cutting portion of the teeth. These lugs enter the channels in the sprocket-wheels and engage with the teeth of the sprockets so that power may be applied through one of the sprockets to properly drive the chain. By this construction the cutting teeth and the lugs may all be stamped out of a single piece, and the whole pivoted and offset as required, and all pivoted together to form an inexpensive and effective chain saw.

In order to properly drive the chain saw the inner sprocket 2 is mounted upon a shaft 11 which shaft has its ends journaled in bearings in a frame 12 as will be hereafter more fully described.

The sprocket 2 has a hub $2^a$ which is fitted and turnable in a sleeve or bearing 13. This sleeve or bearing is carried by a plate 14 which is bolted to the distance-piece A and is bent so that it stands sufficiently to one side of the sprocket to support the bearing 13 within which the hub of the sprocket thus turns, and by which it is steadied, in addition to the bearings at the ends of the shaft. A similar plate $14^a$ is fixed upon the opposite side of the distance-piece as shown, and the shaft also passes through this plate.

The inner ends of the distance-piece A are bent or diverged outwardly where they approach the sprocket-wheel as shown at *a*, and being thus separated they allow the teeth of the chain to pass freely from the sprocket-wheel into the channel of the distance-piece and guide without any danger of being caught and mutilated.

The frame or yoke 12 is preferably made of channel iron bent so that it forms a main body portion, with two legs, $12^a$, $12^b$ projecting at right angles from each end, and in the outer ends of these legs are carried the bearings for the shaft 11, one of said bearings consisting of a closed step or box 15, and the other of a box 16 having a hinged cap $16^a$ which may be readily disengaged and opened to allow the shaft to be removed and reversed if required; the ends of the shaft being so constructed that either of them may fit into the fixed box or step 15. The body portion of this carrier or support 12 is mounted upon a disk 17, which disk is concentric with the motor shaft. A suitable brace 30 may be used to steady the carrier or support as shown.

The motor may be of any suitable or desired construction and its shaft carries upon the end which projects through the frame 12, a pinion 18, and this pinion engages a bevel-gear 19 and thus transmits motion to a shaft 20, which carries a spur pinion 21, and this in turn engages with a spur gear 22 upon the shaft 11 which carries the chain driving sprocket as before described.

It is desirable to vary the position of the saw to cut either high or low, when it is cutting horizontally, or to set it to cut vertically, or at an angle which the position of the work may necessitate. In order to accommodate it to all these positions, the yoke or frame 12 is bolted to the disk 17 by means of bolts passing through concentric slots 23 made near the periphery of the disk 17. The heads of the bolts being movable in the grooves or channels, when the nuts upon the bolts have been loosened it will be seen that the frame 12 can be turned to any desired angle with relation to the disk 17 and the motor, without disengaging the bevel gears 18—19, as these and the motor shaft are on the central line about which the device is turnable.

If it is desirable for any purpose to shift the yoke or frame 12 with relation to the disk 17 it is effected by means of a slot 12ᵉ made lengthwise of the body portion of the yoke and slidable upon a plate 24 which is bolted to the disk 17, and through this plate the motor shaft passes.

By loosening the bolts which hold the frame 12 to the disk it will be seen that the frame may be slid in one direction or the other, thus moving the parts carried by it. In order to allow of this movement without disengaging the driving gears, the bevel gear 19 is slidable on a feather on the shaft 20 so that as the frame 12 is moved, the shaft 20 may slide in unison therewith, but the bevel gear 19 being on a feather the shaft will slide through without disengaging it from the driving pinion.

In order to cut high or low, the shaft 11 may be reversed so that the driving sprocket 2 will be near the top or the bottom as the case may be, when the shaft is vertical so that the saw cuts in a substantially horizontal plane.

In order to allow the motor to be run independently of the saw I have shown a friction clutch as at 26, controlled by a suitable clutch lever 26′ by the use of which the saw-driving mechanism may be disengaged from the motor or engaged therewith.

The distance-pieces may be reinforced or strengthened either by short pieces 30 riveted in a lattice form upon the sides and between the upper and lower edge bars, or the distance-piece may have its central portion corrugated intermediate of the edges.

Having thus described my invention, what I claim and desire to secure by Letters Patent is—

1. An endless flexible saw comprising single plates having teeth upon one side and lugs projecting from the opposite side, said plates having their ends offset in opposite directions and with the offset portions of adjacent plates overlapping and pivoted together the said teeth being alternately offset to substantially correspond to the thickness of the joints at the said overlapping offset ends of the plates.

2. In a sawing apparatus, a chain composed of plates pivoted together having teeth projecting from their outer edges and lugs from their inner edges, a distance-piece having journal-boxes at each end, sprockets mounted upon shafts which are journaled in said boxes, one of said shafts being connected with a motor shaft, and means for reversing or changing the angle of said shaft with relation to the motor shaft.

3. In a sawing apparatus, an endless chain of plates pivoted together having teeth upon the outer edges and lugs projecting inwardly, a grooved or channeled distance plate within which the lugs are guided, grooved sprockets having teeth with which the lugs engage and by one of which sprockets the saw is driven, a shaft upon which the driving sprocket is carried, a frame with journal-boxes in which said shaft is turnable, one of said boxes having a hinged cap member whereby the shaft is readily detachable, a supplemental bearing for the driving sprocket consisting of a plate bolted to the distance piece having a sleeve or box within which the hub of the sprocket is turnable.

4. In a sawing apparatus, an endless flexible chain of plates pivoted together having teeth upon their outer sides and lugs projecting from their inner edges, a channeled distance piece with grooves in which the lugs are guided, grooved sprockets journaled at the ends of the distance-piece having teeth with which the lugs engage, a yoke or frame in which the driving sprocket is journaled, a motor shaft journaled in said frame, a disk fixed to said frame said disk being mounted concentric with the motor shaft and having annular grooves in its face, connections between the sprocket-carrying frame and said disk whereby the frame may be turned or reversed with relation to the disk.

5. In a sawing apparatus an endless sectional saw composed of links pivoted together, a distance-piece with sprockets journaled in its ends, over which sprockets the saw passes, a shaft through which power is transmitted to one of the sprockets, a frame having step-bearing on one arm and a box with a hinged cap on the other arm in which the shaft is reversible, and mechanism through which motion is transmitted to the shaft and saw when in either position.

6. In a sawing apparatus an endless chain of pivoted links with integral cutting teeth and driving lugs, a distance-piece and guide with sprockets journaled at opposite ends, and over which the saw passes, a slotted frame in which the shaft of the driving sprocket is journaled, a fixed support and means whereby the frame may be vertically adjusted relative to said support, a motor shaft journaled in the slot of said frame, and adjustable gearing between the motor shaft and driving sprocket shaft for maintaining operative connection therebetween when the frame is adjusted.

7. An endless flexible saw comprising single plates having teeth upon one side, said plates having their ends offset in opposite directions and with the offset portions of adjacent plates overlapping and pivoted together; the said teeth being alternately offset to substantially correspond to the thickness of the joints at the said overlapping offset ends of the plates.

In testimony whereof I have hereunto set my hand in presence of two subscribing witnesses.

REGINALD L. MUIR.

Witnesses:
S. H. NOURSE,
D. B. RICHARDS.